June 16, 1936.　　　J. F. TRUDEAU　　　2,044,193
TRANSFER CONVEYER
Filed March 30, 1933　　6 Sheets-Sheet 1
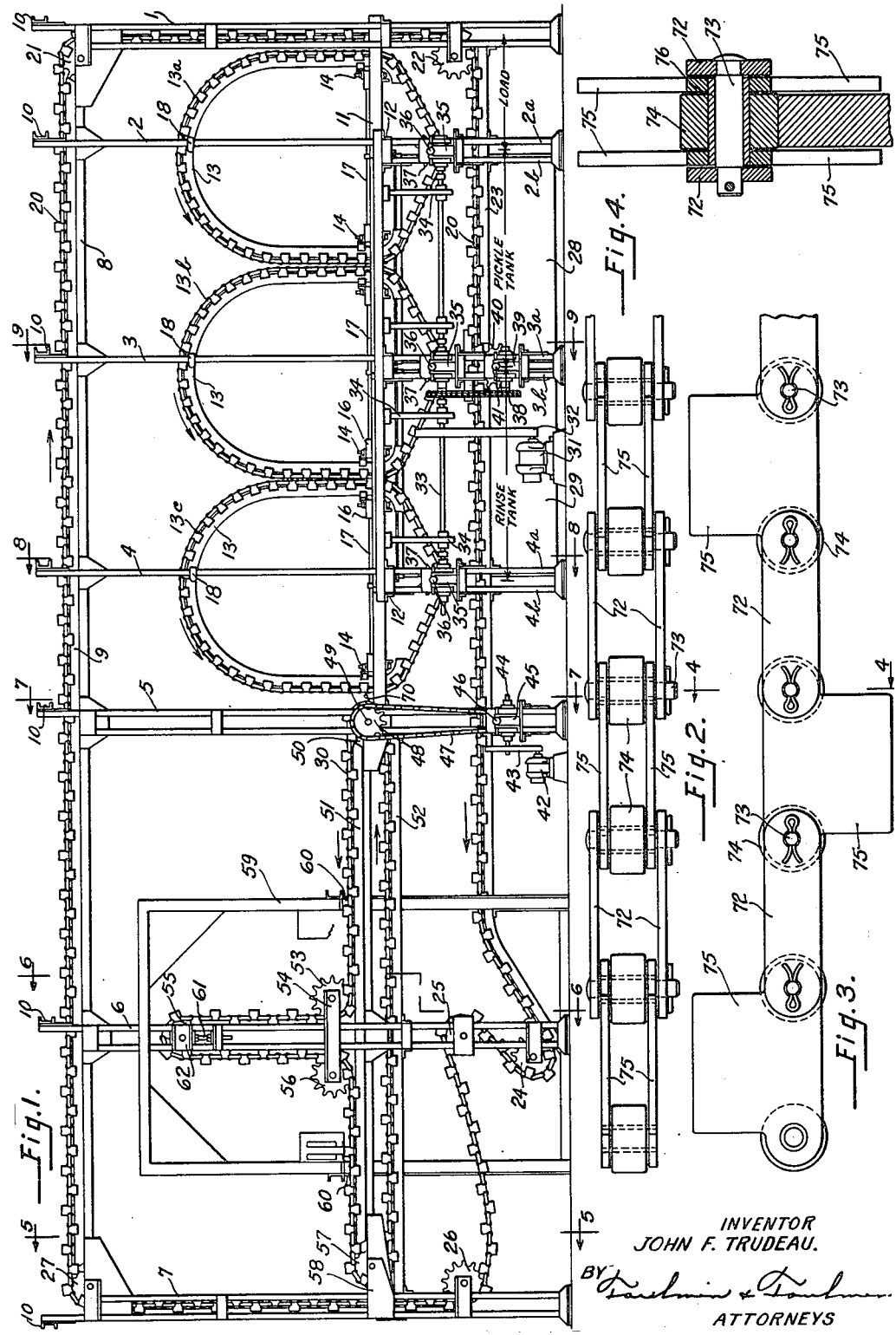
INVENTOR
JOHN F. TRUDEAU.
BY
ATTORNEYS

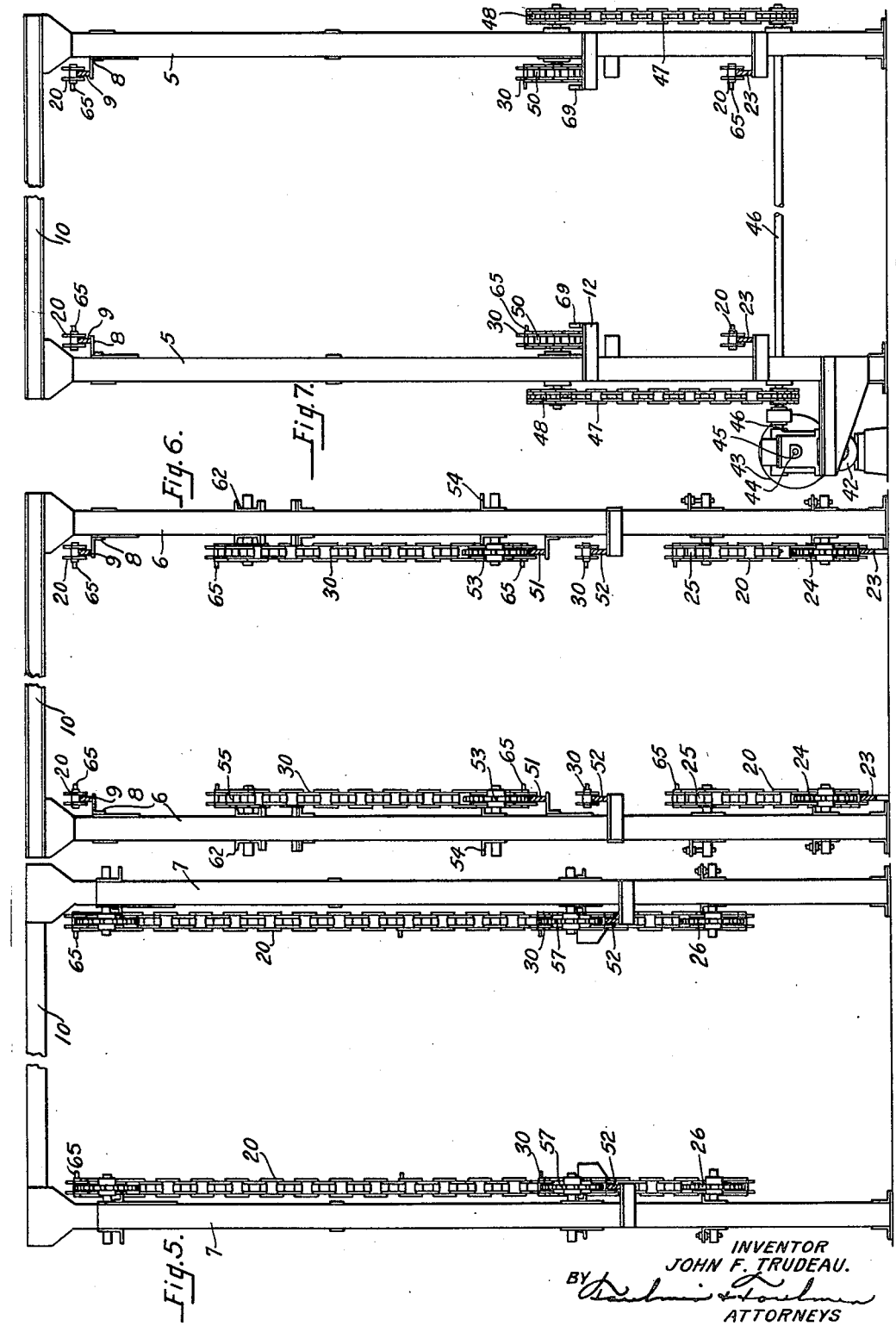

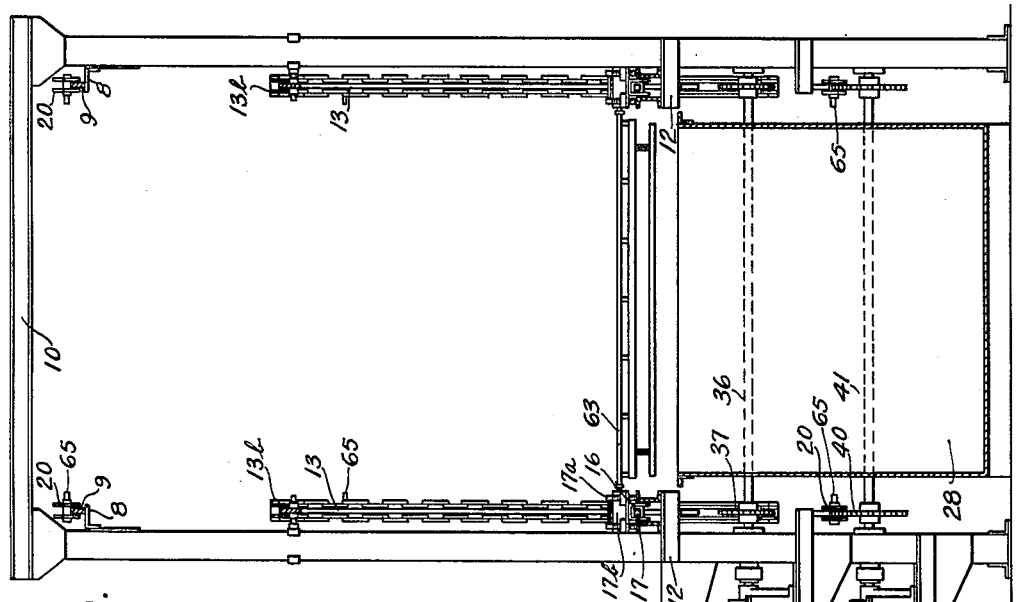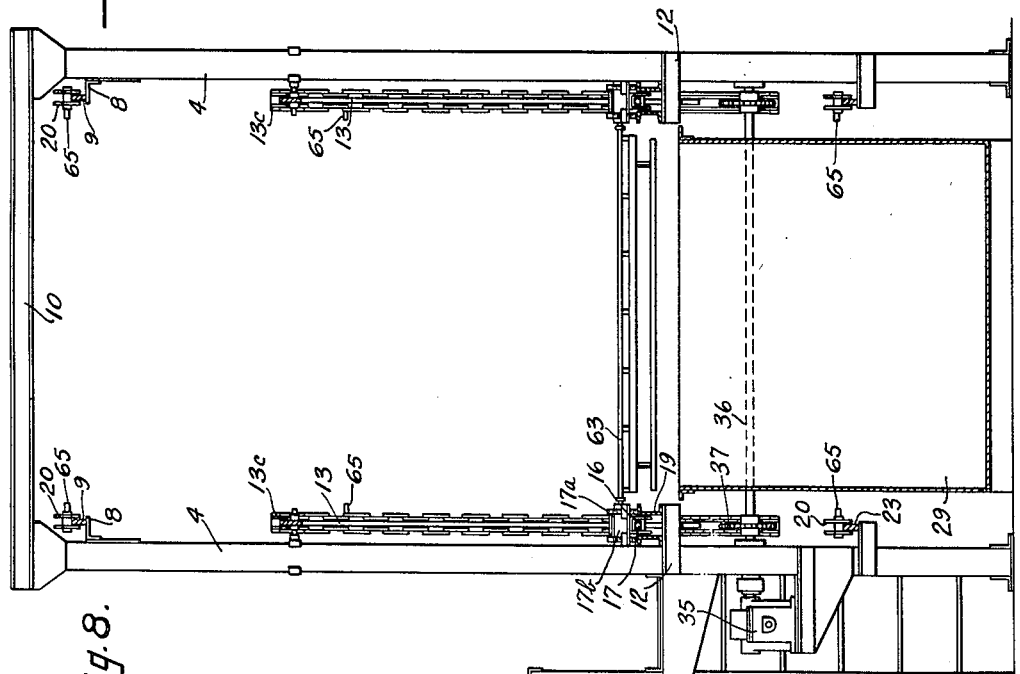

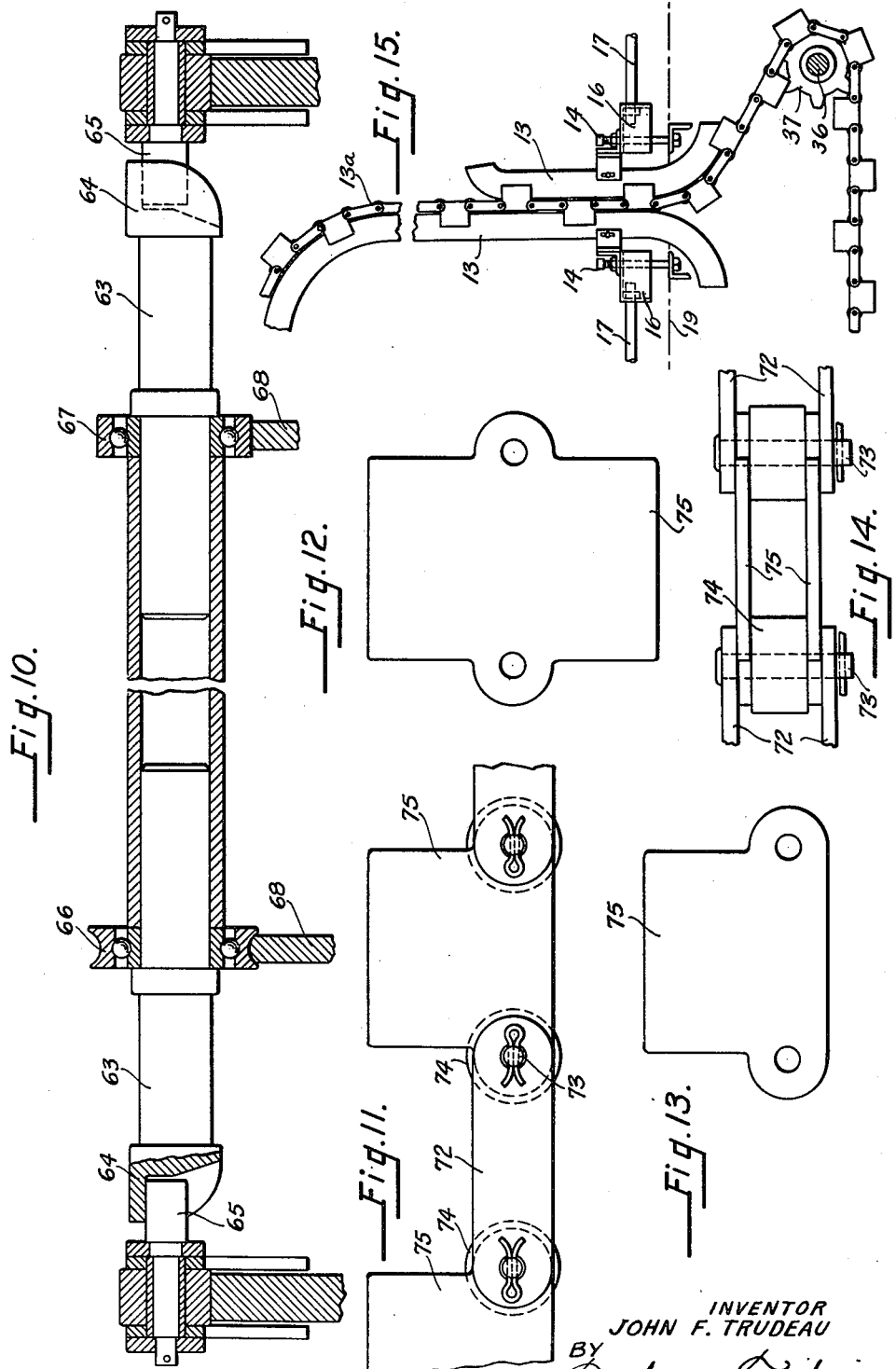

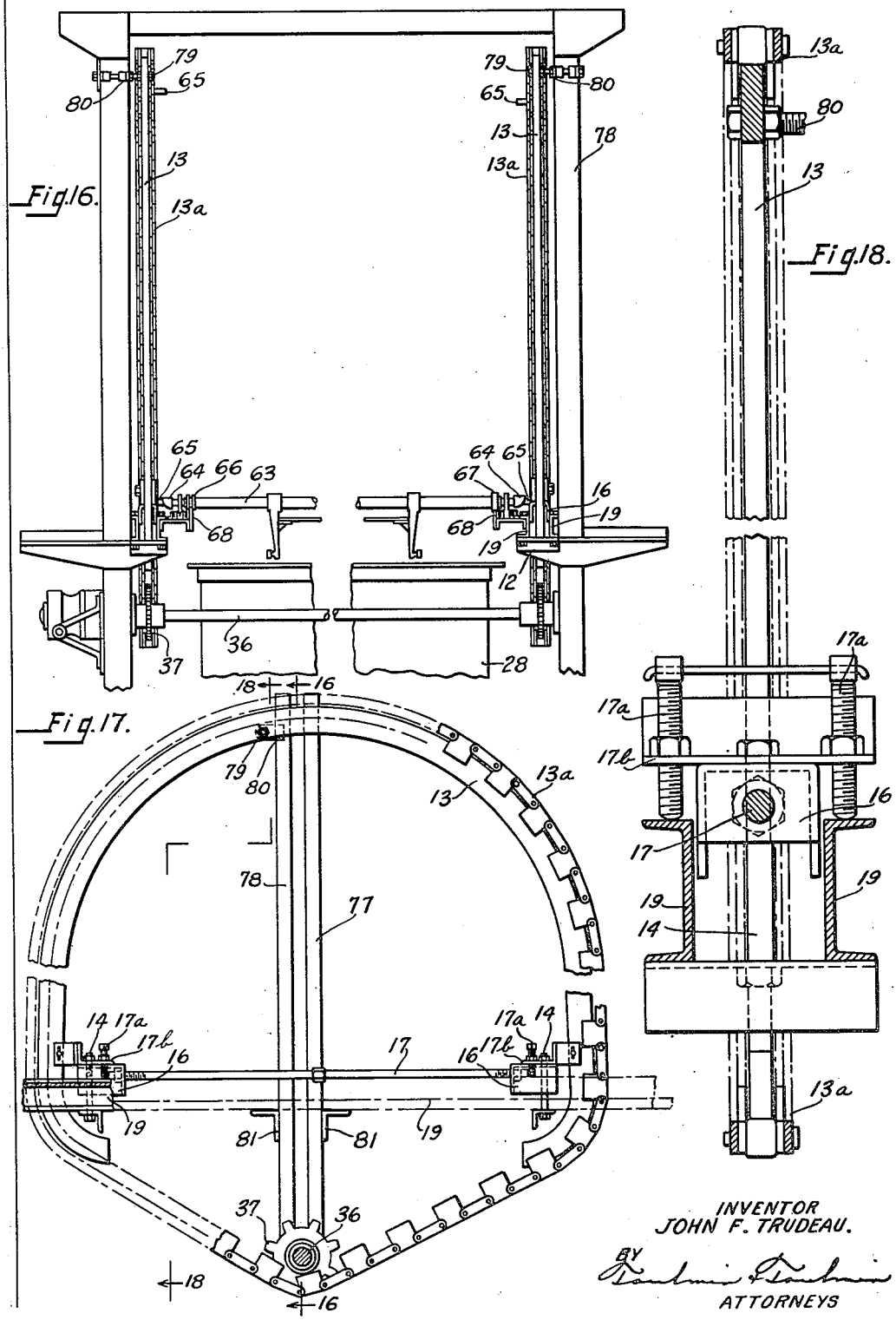

June 16, 1936. J. F. TRUDEAU 2,044,193
TRANSFER CONVEYER
Filed March 30, 1933 6 Sheets-Sheet 6
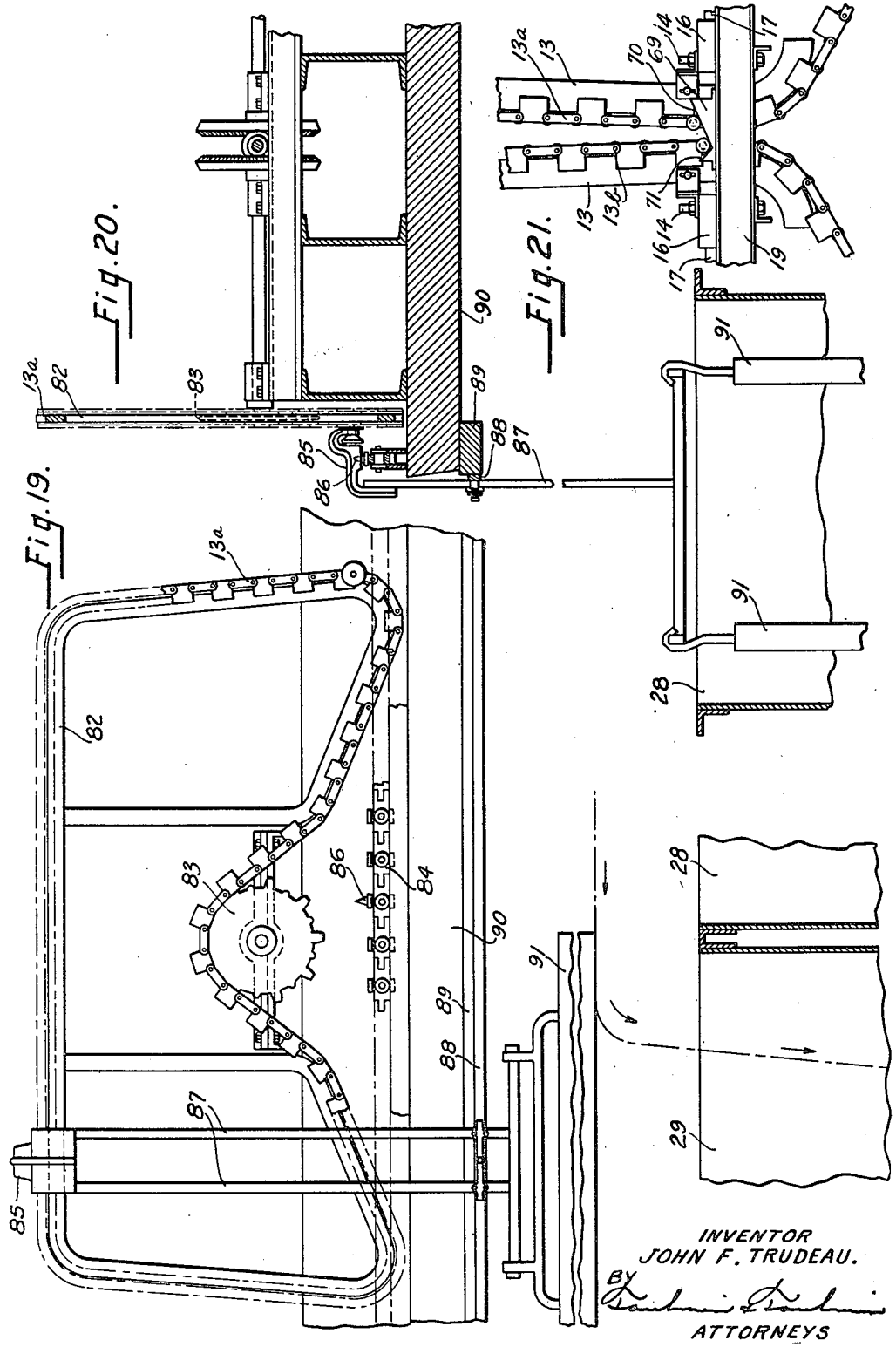
INVENTOR
JOHN F. TRUDEAU.
BY
ATTORNEYS Patented June 16, 1936

2,044,193

UNITED STATES PATENT OFFICE 2,044,193

TRANSFER CONVEYER

John F. Trudeau, Little Silver, N. J., assignor to Hanson-Van Winkle-Munning Company, Matawan, N. J., a corporation of New Jersey Application March 30, 1933, Serial No. 663,571

19 Claims. (Cl. 214—17)

It is the object of my invention to provide a method of treating articles including such steps as cleaning, immersing, electroplating or baking in timed relationship to one another according to the state of the metal and the effect of heat or the effect of air thereon.

In particular, it is the object of my invention to provide a synchronized system by which a satisfactory and inexpensive transfer mechanism for heavy loads is provided in which the mechanism will not cramp or produce excess pressure in the conveying mechanism, such as chain rails and chain guides.

It is a further object to provide such a mechanism with a novel form of chain and tracks so that heavy loads may be raised and lowered by such chains and transferred from one chain to the other.

It is a further purpose to provide a master conveying chain, a succession of vertically-disposed conveyer chains for raising and lowering heavy articles from one position to another and, in the course thereof, remove them from the master chain and convey them from one to the other of the vertically-disposed chains, and a third chain comprising a horizontal conveying portion, a vertical conveying portion and a second horizontal conveying portion, thereby permitting of removal of these articles from one of the vertically-disposed conveyers and the transport of the articles to another.

In other words, I provide a common master chain and conveyer system in combination with various immersion chains and a baking chain synchronized to operate with respect to one another and to transfer the work from one system to the other in timed relationship.

It is a further object to provide a system in which, instead of transferring the articles from one raising and lowering chain to another directly, such articles may be conveyed horizontally by the master chain to and from each raising and lowering station and the chains for that purpose.

To this end the present invention, comprises, in combination with the main automatic conveyer, a transfer conveying mechanism having a rigid track shaped to extend above and between receiving and delivery stations of the main conveyer and project transversely of the path of the main conveyer at said receiving and delivery stations, and a transfer conveyer chain made up of a series of links, anti-friction rollers, pick-up pins or studs and guiding cheek plates; the cheek plates being presented preferably in pairs to straddle and slide upon the track bars for causing the chain to follow the contour of the supporting track bars and resist the lateral strain upon the chains of the hangers which support the articles under treatment. The improved transfer conveyer chain may be made in two endless chains of the character defined operating upon two parallel track bars and driven by means of a common drive shaft acting through sprocket wheels which engage the chains respectively at one point. Unlike the ordinary conveyer chains that have been used for similar purposes, there is preferably only one driving sprocket for each chain, making a pair of sprockets upon a common shaft for the two chains in the improved mechanism, the cheek plates of the transfer chains serving efficiently to guide the chains upon the shaped track bars in travelling transversely of the main conveyer in picking up article carriers from and depositing them upon the main conveyer chains while transferring them from one treatment tank to another.

It will be understood that this mechanism and the method of handling the materials will apply to any type of pickling, coating, enamelling, baking, electroplating or similar apparatus and to any weight within the structural limits of the machine of the material to be handled, but it has been found particularly advantageous with heavy weights which heretofore have been difficult, if not impossible, of handling in any such manner.

Referring to the drawings:

Figure 1 is a side elevation of the apparatus of my invention;

Figure 2 is a top plan view of one of the chains which has cheek links oppositely disposed;

Figure 3 is a side elevation of a portion of the chain with oppositely disposed cheek links;

Figure 4 is a section on the line 4—4 of Figure 3;

Figure 5 is a section on the line 5—5 of Figure 1 looking in the direction of the arrows;

Figure 6 is a section on the line 6—6 of Figure 1 looking in the direction of the arrows;

Figure 7 is a section on the line 7—7 of Figure 1 looking in the direction of the arrows;

Figure 8 is a section on the line 8—8 of Figure 1 looking in the direction of the arrows;

Figure 9 is a section on the line 9—9 of Figure 1 looking in the direction of the arrows;

Figure 10 is a detail section through a portion of the support for one of the carrier rods illustrating in section the method of support on a chain of the carrier rods by a cup and pin construction, such mechanism being particularly shown in Figure 16;

Figure 11 is a side elevation of a portion of the chain having cheek links all on the same side;

Figure 12 is a side elevation of a double cheek link;

Figure 13 is a side elevation of a single cheek link;

Figure 14 is a top plan view of the links in Figure 11;

Figure 15 is a detail side elevation of a modified form of track and chain transfer mechanism;

Figure 16 is a section on the line 16—16 of Figure 17 looking in the direction of the arrows, showing a modified form of raising and lowering chain construction;

Figure 17 is a side elevation of a modified form of raising and lowering chain construction;

Figure 18 is a section on the line 18—18 of Figure 17;

Figure 19 is a side elevation of another modified form of elevating and lowering chain adapted to move from and return to the master chain, the carrier for the articles being treated, such master chain being used in this connection for transferring the carrier directly from one raising and lowering stage to another;

Figure 20 is a section on the line 20—20 of Figure 19;

Figure 21 is a detail illustration of the method of transfer of a rod carrier from one raising and lowering chain to another in the construction shown in Figure 1.

Referring to the drawings in detail, I provide a plurality of vertical standards or frame members, such as 1, 2, 3, 4, 5, 6, and 7, of which there may be any number. These vertical standards extend from the top to the bottom of the machine. On their tops they support the longitudinal rails 8 having vertically disposed tracks 9. The upright standards 1 to 7 inclusive are joined at their tops in spaced pairs by the cross members 10. Intermediate the length of these vertical standards are horizontal side rails 11 which extend between the rails 19 on the brackets 12 carried on the vertical standards 1, 2, 3, 4, and 5 from standard 1 to standard 5. Such side rails are arranged to carry the vertically disposed tracks 13 known as the raising and lowering tracks. Mounted on the track 13 is a raising and lowering chain 13a. This track 13 is mounted upon the side rails through the bolts 14 and aligning clips 15. The bolts 14 are supported in brackets 16 that are spaced by the spacer rod 17. This construction is vertically aligned and adjusted by the screws 17a and the cross plates 17b. In this way, the lower ends of the tracks are vertically positively aligned and spaced. The top portion of the track 13 is connected at 18 to the standard such as at 2, 3 or 4.

The side rails are supported and aligned by additional spaced rails 19 mounted on the brackets 12. From these brackets 12 to the foundation extend the bifurcated lower ends, such as 2a, and 2b or 3a and 3b or 4a and 4b.

The master chain designated 20 moves as indicated by the arrows over the sprocket 21 downwardly adjacent the standard 1 under a sprocket 22 and thence to the left hand over the rail 23 carried on the standards 1 to 6 inclusive and thence beneath the sprocket 24 over the sprocket 25 (both of such sprockets being carried on the standard 6) thence beneath the sprocket 26 on the standard 7 thence upwardly over the sprocket 27 at the top of the standard 7 whence it passes on to the rail 9 which guides it in its course of travel to the sprocket 21.

Associated with each of the raising and lowering chains 13a are tanks into which the articles carried by the chains are immersed when they are brought to rest by the chains and during their period of movement by the respective chains 13a.

For instance, at the right hand end of the machine shown in Figure 1 is the loading station 10 at which point articles are loaded upon the chain 13a whence they may be conveyed upwardly and thence downwardly into the pickling tank 28 where they remain a predetermined period until the chain 13b elevates them quickly and again lowers them into the rinse tank 29 after which they are elevated quickly and lowered by the chain 13c and are then deposited upon the chain 30 known as the oven chain.

It will be understood that there may be any number of the chains 13a, 13b and 13c and any number of tanks depending upon the number of operations to be performed.

If it is desired to electroplate, there may be an electroplating tank and any other electro-chemical operation may be performed as desired.

In the present instance, for the purpose of simplicity, I have shown a loading station, a pickling station, a rinsing station and a coating or baking station.

These chains 13a, 13b and 13c are driven from a common driving motor 31 through the belt 32 which drives the shaft 33 carried in the brackets 34 suspended from the rails 19. The shaft 33 drives through the gear boxes 35 the cross shaft 36 carrying the sprockets 37. The shaft 33 also drives through the chain 38 and through the gear reduction box 39 the sprockets 40 on the shaft 41 which drives the master chain 20.

*Oven chain*

The motor 42 drives through the belt 43 the shaft 44 of a speed reducer 45 having a driven shaft 46 which drives the chain 47 that in turn drives the sprocket 48 on a shaft 49 carrying the driving sprocket 50 for the oven chain.

This oven chain is guided on the upper and lower rails 51 and 52 carried on the standards 56 and 57. It passes beneath the sprocket 53 on the bracket 54 of the standard 6 and thence upwardly and over the sprocket 55 downwardly under the sprocket 56 thence over the sprocket 57 carried on a bracket 58 of the standard 7 and back on the rail 52 to the original sprocket 50.

When it passes over the sprocket 57 it is in its position to unload the carrier rods on to the main chain 20 at the left hand unloading station.

The frame 59 indicates the oven frame having ports 60 through which the chain 30 is adapted to pass and carry with it the carrier rods and articles carried. The heating mechanism and spray mechanism, if used for coating in this oven, are omitted for the purpose of clarity. The slack in the chain 30 is taken up by the adjusting screw 61 operating on the sliding support 62 over the sprocket 55.

*Carrier rods*

The carrier rod may be of any desired construction. One form is shown in Figure 10.

It comprises a rod 63 having inverted cups 64 at either end adapted to ride upon the pins 65 carried by the carrier chains. In this particular instance, as shown in Figure 10, there may be guide rollers 66 and 67 being guided on tracks 68 or the rods may rest directly upon transfer tracks, such as shown in Figure 21, designated 69 having an inclined surface 70 and an inclined abutment 71 at the end of the track to position the rod so that it will be picked up by the cup. The cup may be either inverted as shown in Figure 10 or right side up depending upon the type of transfer desired.

Chain

The chain construction of the master chain 20 is that shown in Figures 2, 3, and 4 in which the links consisting of alternately spaced plates 72 joined by pintle pins 73 and carrying rollers 74 adapted to ride on top of the track 9 are shown. Interleaved between these plates 72 are oppositely disposed cheek plates 75 adapted to engage the tracks 9 and 23. Thus, the load on the tracks is carried by the roller 74 and the chains are prevented from binding on the tracks by the cheek plates of the cheek links 75. A suitable bearing sleeve 76 is carried on each pintle pin 73 to provide a suitable bearing support for the links 72 and 75 and the roller 74.

The raising and lowering chain, such as 13a, 13b and 13c is of the form shown in Figures 11 and 13 where all of the cheek plates are on the same side of the chain riding upon the tracks 13.

The same form of chain as the main carrier chain is employed through an oven chain having oppositely disposed cheek links.

Referring to Figure 16, it will be noted that there is a modification in the track 13 by the use of a bifurcated brace or standard member 77 and 78, which members are retained on the track 13 by the bolt 79 and clips 80. These vertical members 77 and 78 are connected by brackets 81 to the side rails 19.

A further modification is shown in Figure 19 where the generally rectangular frame 82 is provided with a chain 13a driven by the sprocket 83. It is adapted to remove from the horizontal master chain 84 the hooked bracket 85, rapidly elevate it and transfer it and again lower it on to the chain 84 for engagement with the lug 86 on the chain 84. This hooked bracket carries the depending carrier rods 87 which have a contact shoe 88 engaging the plate 89 of the main support 90. Articles 91 are hung upon the branched carrier rod 87 in the usual manner.

This modified construction illustrates the principle of transferring at intervals the carrier rods and brackets to and from the master chain 84 as distinguished from the transfer shown in Figure 21, for instance, where it is made from raising and lowering chain to raising and lowering chain directly and the master chain only has the function of loading the raising and lowering chains and unloading from the oven chains.

Method of operation

In the method of operation of my apparatus, I load at the right hand end of the machine by transferring the carrier rods from the main chain 20 to the chain 13a and place upon the carrier rods the articles to be treated which are then elevated, transferred and lowered into the tank such as the pickling tank 28 where they remain an appreciable period until the next succeeding cup or similar mechanism on the chain 13b lifts them from the track 69 quickly elevating the articles from the pickling tank and transfers them over to the rinsing tank where they again come to rest due to the fact that the carrier rods are resting on a track 69 until they are picked up by cups or other suitable mechanism on the chains 16c, at which time they are quickly elevated and transferred to the last pair of tracks 69 whence they are elevated by the oven chain 5 and are conveyed into the oven and thence through a tortuous path through the oven to give an appreciable time for the baking operation to take place whereupon they are removed from the oven, the carrier rods are picked up by the main carrier chain 20 and the articles which have been treated are removed. Thus, the carrier chain only has the burden of returning the carrier rods to the loading station. This conveyer is of the dwell type in which the mechanism remains stationary for a fixed period with the work carrier at each of a series of processing stations, such as a loading station, a pickling station, a rinsing station, a neutralizing station, an oven station and an unloading station. A timing device starts the main driving motor 31 to advance the carriers to the next process. In order to avoid stopping the work for a dwell period between the tank 29 and the oven, there is a separate drive for the oven station, such as the oven chain 30 and its driving mechanism operating immediately after the transfers and return chain have come to rest or they may be simultaneously operated. Chains can stop themselves in any desired position by tripping the motor circuit. The exact position of the pick-up pins or cups on the chains may be utilized to determine the sequence of operations and the period between the movements of the articles to be treated.

Heretofore, all conveyers have given great difficulty in producing a satisfactory and inexpensive transfer mechanism for heavy loads on account of the tendency of the chain to cramp and to produce an excessive pressure between the chain roller and the chain guides which I obviate with the mechanism heretofore shown and described.

The rollers with my chain can turn freely as the chain is guided by the extended side cheek links with the result that there is no binding.

It will be understood that I desire to comprehend within my invention such modifications as may be necessary to adapt it to varying conditions and uses.

Having thus fully described my invention, what I claim as new and desire to secure by Letters Patent, is:

1. In combination, a two-story frame, a master chain passing along the top, bottom and ends of said frame, a plurality of vertically disposed raising and lowering chains, guide frames therefor, transfer stations between said master chains, the raising and lowering chains and between said raising and lowering chains, immersion tanks associated with the transfer stations between said raising and lowering chains.

2. In combination, a two-story frame, a master chain passing along the top, bottom and ends of said frame, a plurality of vertically disposed raising and lowering chains, guide frames therefor, transfer stations between said master chains and the raising and lowering chains and between said raising portions and lowering portions of the raising and lowering chains, immersion tanks associated with the transfer stations between said raising and lowering chains, means for driving said chains in synchronism with one another, an oven chain adapted to remove material from a rest station at the end of the last raising and lowering chain, transport material carried thereby through an oven and deliver a portion of the load from the oven chain on to the master chain for return to the initial loading station adjacent the initial raising and lowering chain.

3. In combination, a frame having a lower track and an upper track on either side thereof, means for guiding spaced master chains on said frame overlapping the respective sides of said tracks, rollers on said chains for riding on top of said tracks, vertically disposed, inverted, U-shaped tracks on said frames disposed in oppositely arranged pairs, chains having rollers adapted to roll on said tracks, and means on said chains for engaging the opposite sides of said tracks, means on all of said chains for supporting carrier rods detachably.

4. In combination, a frame having a lower track and an upper track on either side thereof, means for guiding spaced master chains on said frame overlapping the respective sides of the tracks, rollers on said chains for riding on top of said tracks, vertically disposed, inverted, U-shaped tracks on said frames disposed in oppositely arranged pairs, chains having rollers adapted to roll on said tracks, means on said chains for engaging the opposite sides of said tracks, means on all of said chains for supporting carrier rods detachably, and means intermediate said chains for facilitating the transfer of said rods from one chain to the other and supporting the rods and any work pieces carried thereby between the periods of conveyance by the respective chains.

5. In combination, a frame having a lower track and an upper track on either side thereof, means for guiding spaced master chains on said frame overlapping the respective sides of the tracks, rollers on said chains for riding on top of said tracks, vertically disposed, inverted, U-shaped tracks on said frames disposed in oppositely arranged pairs, chains having rollers adapted to roll on said tracks, means on said chains for engaging the opposite sides of said tracks, means on all of said chains for supporting carrier rods detachably, means intermediate said chains for facilitating the transfer of said rods from one chain to the other and supporting the rods and any work pieces carried thereby between the periods of conveyance by the respective chains, immersion tanks beneath said transfer means whereby work pieces carried by said rods will be immersed while stationary between periods of transportation by the chains.

6. In combination, a frame, a pair of spaced inverted, U-shaped tracks oppositely disposed on said frame, raising and lowering chains adapted to move on said tracks, said chains having rollers riding on the edges of said tracks and cheek plates engaging the sides of said tracks, and adjusting means for adjustably positioning said tracks relatively to said frame.

7. In combination, a frame, a pair of spaced inverted, U-shaped tracks oppositely disposed on said frame, raising and lowering chains adapted to move on said tracks, said chains having rollers riding on the edges of said tracks and cheek plates engaging the sides of said tracks, and a master chain having rails, tracks and oppositely disposed cheek plates for alternately engaging said tracks, and means for detachably supporting carrier rods on said chains, and means of transferring said rods from one place to another.

8. In combination, a frame, means to move carrier rods in a circuitous path, means to unload and position work rods at predetermined stations, means including tracks mounted on said frame to pick up said work rods and rapidly raise and lower them from one station to another, and adjusting means for adjustably positioning said tracks relatively to said frame.

9. In combination, a frame, means to move carrier rods in a circuitous path, means to unload and position work rods at predetermined stations, means to pick up said work rods and rapidly raise and lower them from one station to another, said rapidly raising and lowering means comprising a track mounted on said frame, a chain having rollers engaging the edge of the track and cheek plates engaging the sides of the track whereby carrier rods which support heavy loads can be rapidly raised and lowered without binding, and adjusting means for adjustably positioning said track relatively to said frame.

10. In combination, a frame, a pair of oppositely disposed chain guide tracks mounted on said frame, chain means having rollers and cheek plates adapted to engage said tracks, rod receiving stations between said tracks adapted to shift rods from one of the chains and place them in position to be picked up by the other of the chain means, and adjusting means for adjustably positioning said tracks relatively to said frame.

11. In combination, oppositely disposed tracks, oppositely disposed chains comprising articulated links having pintle pins, rollers on the pins between the links, and cheek plates on the links engaging the side walls of the track; and certain of the pintle pins having carrier rod engaging extensions, carrier rods having means on the ends thereof for detachably engaging said extensions whereby the rods are carried between and by the chains.

12. In combination, a pair of side frames, means interconnecting said side frames in spaced relationship, inverted, U-shaped tracks carried on said side frames, immersion tanks below said tracks and between said side frame, a master rod carrying pair of chains mounted on said side frames, rod and loading transport chains mounted on said inverted U-shaped frame tracks, means for transferring rods from one chain to the other and a common driving means for driving all of said chains in timed relation, and an independent chain system adapted to remove rods and work pieces carried thereby from one of said chains and to deliver rods to the master chains.

13. In an apparatus of the character described, the combination with a main conveyer, of a frame, a transfer conveyer operating in timed relation with said main conveyer for transferring work-piece hangers between said conveyers, said transfer conveyer comprising a rigid track mounted on said frame and intersecting the path of the main conveyer, a transfer conveyer chain encompassing and sliding upon said track, means upon said transfer chain for supporting work-piece hangers, and adjusting means for adjustably positioning said track relatively to said frame.

14. In an apparatus of the character described, the combination with a main conveyer, of a frame, a transfer conveyer operating in timed relation with said main conveyer for removing work-piece hangers from said main conveyer at one point and returning said hangers to said conveyer at another point, said transfer conveyer comprising a rigid track mounted on said frame and intersecting the path of the main conveyer at two points, a transfer conveyer chain encompassing and sliding upon said track, means upon said transfer chain for supporting work-piece hangers, and adjusting means for adjustably positioning said track relatively to said frame.

15. In an apparatus of the character described, the combination with a main conveyer, of a transfer conveyer operating in timed relation with said main conveyer for transferring work-piece hangers between said conveyers, said transfer conveyer comprising a rigid track intersecting the path of the main conveyer, means adjustably securing said track in cooperative relation with said main conveyer, a conveying chain encompassing and sliding upon said track, and means upon said transfer chain for supporting work-piece hangers.

16. In an apparatus of the character described, in combination with a series of treatment tanks, a main conveyer traversing said series of tanks, and a plurality of spaced transfer conveyers operating in timed relation with said main conveyer for causing the disengagement and engagement of work-piece hangers with said main conveyer and the transfer of said hangers from one tank to another, each said transfer conveyer comprising a rigid track extending transversely of the main conveyer and projecting overhead and bridging two adjacent tanks, a conveying chain embracing and sliding upon said track and having means for engaging and supporting work-piece hangers, and adjusting means for adjustably positioning said transfer conveyer tracks relatively to one another.

17. In an apparatus of the character described, the combination with a main conveyer, of a plurality of spaced transfer conveyers operating in timed relation with said main conveyer for causing the disengagement and engagement of work-piece hangers from and with said main conveyer and said transfer conveyers, each said transfer conveyer comprising a rigid track extending transversely of the main conveyer, a transfer conveying chain provided with guide cheek links embracing and sliding upon said track and means for engaging and supporting work-piece hangers, and adjusting means for adjustably positioning said transfer conveyer tracks relatively to one another.

18. In an apparatus of the character described, the combination with a main conveyer traversing a series of transfer stations, of a transfer conveyer operating in timed relation with said main conveyer for removing work-piece hangers from said main conveyer at certain of said transfer stations and returning said hangers to said main conveyer at other transfer stations, said transfer conveyer comprising a rigid arching track intersecting the path of the main conveyer at two adjacent transfer stations, said track having curved guide portions adjacent said points of intersection, a conveying chain provided with guide cheek links embracing and sliding upon said track, and means upon said transfer chain for engaging and supporting work-piece hangers.

19. In an apparatus of the character described, the combination with a main conveyer traversing a series of transfer stations, of a transfer conveyer operating in timed relation with said main conveyer for removing work-piece hangers from said main conveyer at certain of said transfer stations and returning said hangers to said main conveyer at other transfer stations, said transfer conveyer comprising two parallel rigid track bars extending transversely of the main conveyer and forming a double track bridge between adjacent points of intersection, and two transfer conveying chains respectively embracing and sliding upon said track bars and each provided with an inwardly presented pin or lug for engaging and supporting work-piece hangers.

JOHN F. TRUDEAU.